US008121191B1

(12) United States Patent
Haskell

(10) Patent No.: US 8,121,191 B1
(45) Date of Patent: Feb. 21, 2012

(54) AVC TO SVC TRANSCODER

(75) Inventor: Paul Haskell, Saratoga, CA (US)

(73) Assignee: Harmonic Inc., San Jose, CA (US)

( * ) Notice: Subject to any disclaimer, the term of this patent is extended or adjusted under 35 U.S.C. 154(b) by 1073 days.

(21) Appl. No.: 12/014,717

(22) Filed: Jan. 15, 2008

Related U.S. Application Data

(60) Provisional application No. 60/987,708, filed on Nov. 13, 2007.

(51) Int. Cl.
*H04B 1/66* (2006.01)
*H04L 12/28* (2006.01)

(52) U.S. Cl. .................................. 375/240.1; 370/395.2

(58) Field of Classification Search .................. 375/240, 375/240.03, 240.1, 240.23, 240.12; 709/231; 370/395.21, 468, 485–487, 535–538
See application file for complete search history.

(56) References Cited

U.S. PATENT DOCUMENTS

| 5,953,506 | A | 9/1999 | Kalra et al. |
| 6,038,256 | A | 3/2000 | Linzer et al. |
| 6,091,776 | A | 7/2000 | Linzer |
| 6,310,915 | B1 | 10/2001 | Wells et al. |
| 6,925,501 | B2 * | 8/2005 | Wang et al. .................. 709/231 |
| 6,950,464 | B1 * | 9/2005 | Shen et al. ............... 375/240.03 |
| 6,961,377 | B2 | 11/2005 | Kingsley et al. |
| 7,058,127 | B2 * | 6/2006 | Lu et al. ................... 375/240.06 |
| 7,292,602 | B1 * | 11/2007 | Liu et al. ......................... 370/468 |

OTHER PUBLICATIONS

Tudor, P.N., "MPEG-2 Video Compression," tutorial, Electronics & Communication Engineering Journal, Dec. 1995, 17 pp.
Wiegand, T. et al., "Study text (version 3) of ISO/IEC 14496-10:2005/FPDAM3 Scalable Video Coding (in integrated form with ISO/IEC 14996-10)," ISO/IEC JTC 1/SC 29/WG 11 N 8962 Apr. 2007, San Jose, CA, 568 pp.
International Standard ISO/IEC 14496-10, Third edition Dec. 15, 2005, Corrected version Mar. 1, 2006, "Information technology—Coding of audio-visual objects—Part 10: Advanced Video Coding," 356 pp.
International Staandard ISO/IEC 14496-10:2005, Technical Corrigendum 2, Aug. 15, 2006, "Information technology—Coding of audio-visual objects—Part 10: Advanced Video Coding," 3 pp.

* cited by examiner

*Primary Examiner* — Hanh Nguyen
(74) *Attorney, Agent, or Firm* — Haynes Beffel & Wolfeld LLP; Warren S. Wolfeld

(57) ABSTRACT

Roughly described, an input unencoded video stream is first encoded according to a high quality compression standard such as 1080P@60 AVC. The high quality compressed video stream is then transcoded into a scalable format, such as 1080P@60 SVC. Developing the scalable video stream by transcoding offers significant benefits over developing it natively from the original uncompressed picture sequence.

25 Claims, 3 Drawing Sheets

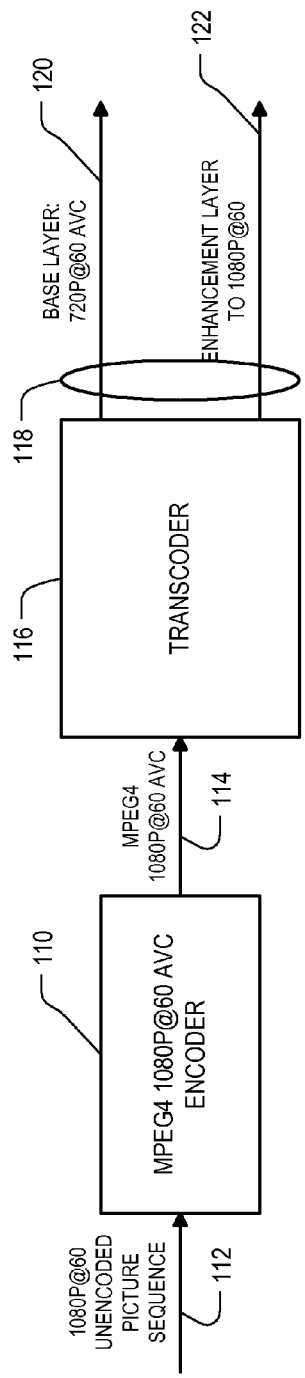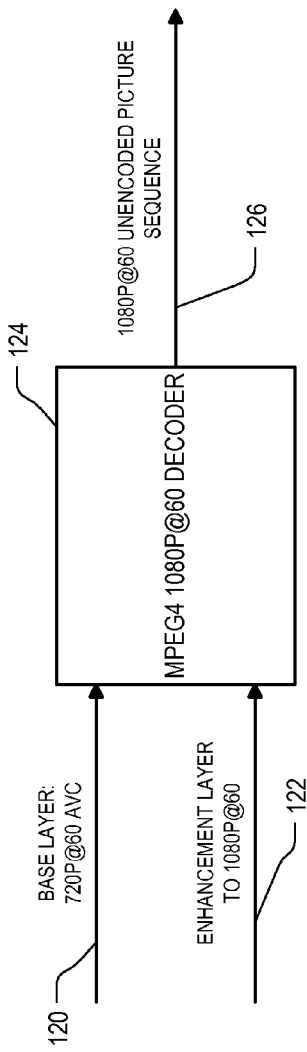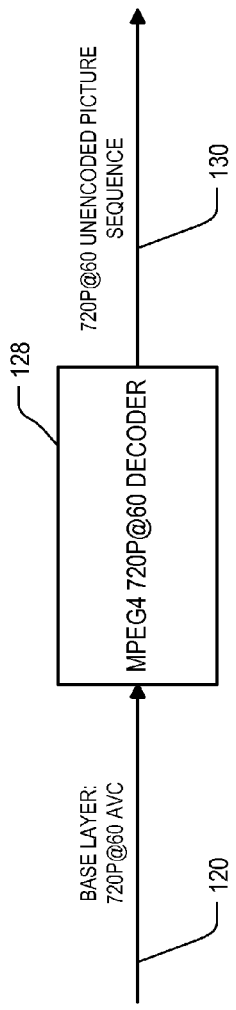

AVC TO SVC TRANSCODER

BACKGROUND

Scalable Coding of video refers to compression techniques that result in a compressed bitstream in which one or more subsets of the whole bitstream can be decoded, at reduced quality (such as reduced resolution, frame rate, or bit-rate). Scalable coding techniques have been present in most video compression standards, including MPEG-1, MPEG-2 and MPEG-4. Examples of scalable video coding include compression of an HD bitstream in which an SD subset can be decoded, or compression of a 60 Hz bitstream in which a 30 Hz subset can be decoded.

A particular application of scalable video compression arises because many TV operators are planning to deploy 1080P @ 60 Hz video services in the next few years. This format is what is used by many of the high-end consumer HD displays currently being purchased. The fact that this format is scanned progressively eliminates the need for de-interlacing within the consumer display, and the 1080 line format offers higher resolution than the 720P format.

The Joint Video Team (JVT) of the ISO/MPEG group and the ITU-T have developed a Scalable Video Coding (SVC) draft standard based on H.264/AVC. According to the draft, an SVC encoder outputs a base layer stream which is of lower quality than the original, and at least one enhancement stream. A receiver can choose to decode only the base layer stream, or it may choose to decode the base layer stream in combination with one or more of the enhancement streams to reconstruct a higher quality picture sequence. The SVC draft includes a great deal of flexibility for scalable coding of video, and its compression tools offer high efficiency. However, the complexity of the SVC technology is high, both for encoders and decoders. A need therefore exists to develop a satisfactory mechanism for implementing an SVC codec cost-effectively.

SUMMARY

In an aspect of the invention, roughly described, instead of implementing SVC encoding from the input uncompressed video stream directly, the input unencoded video stream is first encoded according to a high quality compression standard such as 1080P@60 AVC. The high quality compressed video stream is then transcoded into the scalable format, such as 1080P@60 SVC. 1080P@60 AVC codecs are currently available commercially, and the implementation complexity of the transcoder is lower than that of a native encoder, especially if the coding decisions in the incoming 1080P are re-used for either the re-encoding of the base layer output stream, or the enhancement layer output stream, or both. For certain applications, the transcoder advantageously may be implemented on a general purpose computer. The technique therefore permits implementation of SVC encoding cost-effectively.

Particular aspects of the present invention are described in the claims, specification and drawings.

BRIEF DESCRIPTION OF THE DRAWINGS

The invention will be described with respect to particular embodiments thereof, and reference will be made to the drawings, in which:

FIG. 1A is an overall block diagram of an encoder incorporating features of the invention.

FIGS. 1B and 1C illustrate conventional receivers for decoding a scalable video stream.

DETAILED DESCRIPTION

Figure 2:
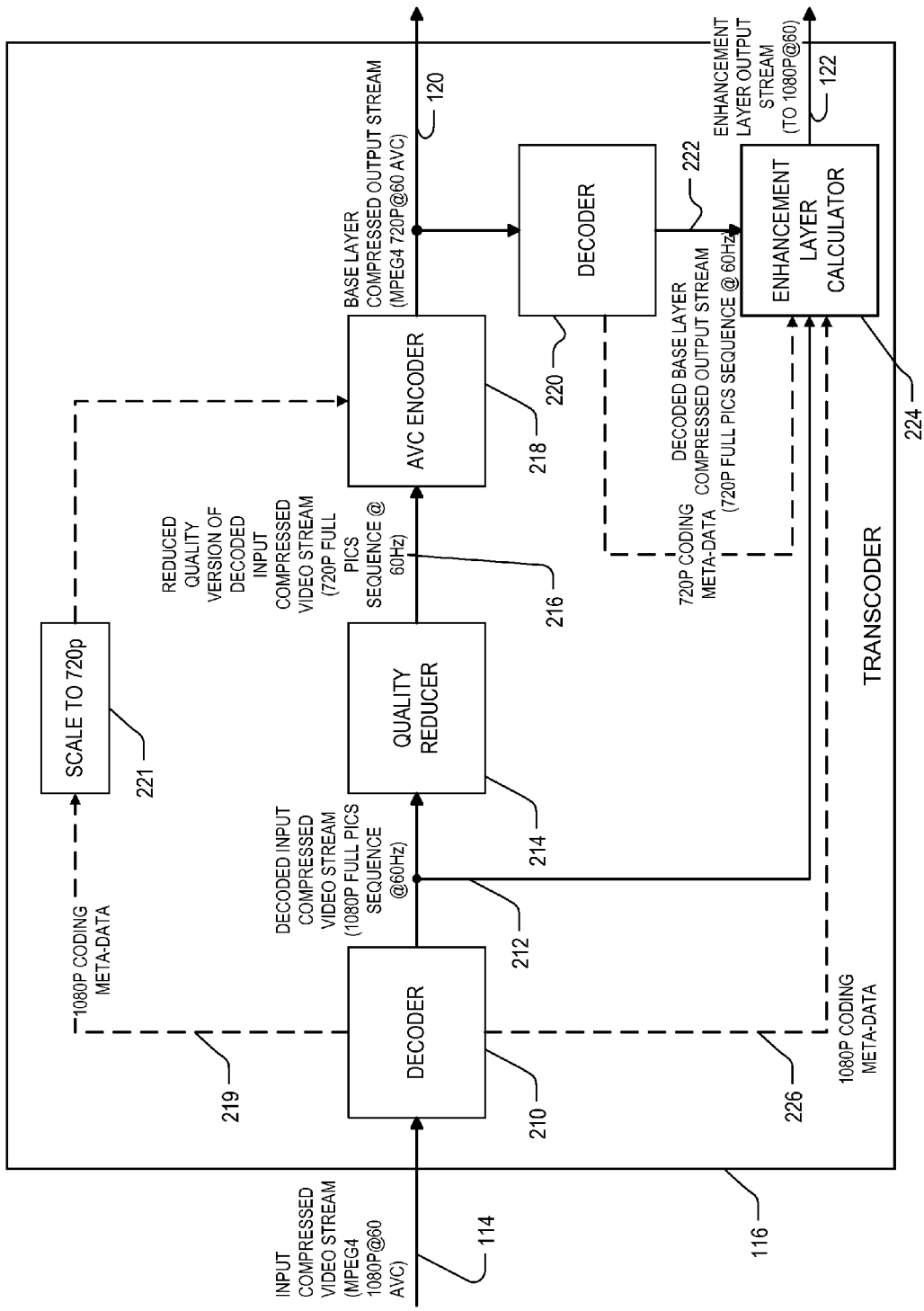
FIG. 2 is a symbolic block diagram of an embodiment of the transcoder of FIG. 1A.

The following detailed description is made to illustrate the present invention, not to limit its scope, which is defined by the claims. Those of ordinary skill in the art will recognize a variety of equivalent variations on the description that follows.

Background Information

The MPEG-4/AVC standard is widely used for encoding video. According to this standard, pictures are both spatially and temporally encoded. Each picture is first divided into non-overlapping macroblocks, where each macroblock includes a 16×16 array of luminance samples and blocks of 8×8 chrominance samples overlaid thereon. A decision is made to encode the macroblock as an inter macroblock, in which case the macroblock is both temporally and spatially encoded, or to encode the macroblock as an intra macroblock, in which case the macroblock is only spatially encoded. A macroblock is temporally encoded by an inter-picture motion compensation operation. According to such an operation, a prediction macroblock is identified for the to-be-motion compensated macroblock and is subtracted therefrom to produce a prediction error macroblock. The prediction macroblock originates in another picture, called a reference picture, or may be an interpolation of multiple prediction macroblocks, each originating in different reference pictures. The prediction macroblock need not have precisely the same spatial coordinates (pixel row and column) as the macroblock from which it is subtracted and in fact can be spatially offset therefrom. A motion vector is used to identify the macroblock by its spatial shift and by the reference picture from which it originates. (When the prediction macroblock is an interpolation of multiple prediction macroblocks, a motion vector is obtained for each to-be-interpolated prediction macroblock).

Pictures may be classified as intra or I pictures, predictive or P pictures and bidirectionally predictive or B pictures. An I picture contains only intra macroblocks. A P picture may contain inter macroblocks, but only forward directed predictions from a preceding reference picture are permitted. A P picture can also contain intra macroblocks for which no adequate prediction was found. A B picture can contain intra macroblocks, inter macroblocks that are forward direction motion compensated, inter macroblocks that are backward directed motion compensated, i.e., predicted from a succeeding reference picture, and inter macroblocks that are bidirectionally motion compensated, i.e., predicted from an interpolation of prediction macroblocks in each of preceding and succeeding reference pictures. If the P or B pictures are interlaced, then each component field macroblock can be separately motion compensated or the two fields can be interleaved to form a frame macroblock and the frame block can be motion compensated at once.

Spatial compression is performed on selected 8×8 luminance pixel blocks and selected 8×8 pixel chrominance blocks of selected prediction error macroblocks, or selected intra macroblocks. Spatial compression includes the steps of transforming each block, quantizing each block, scanning each block into a sequence, run-level encoding the sequence and variable length encoding the run-level encoded sequence.

Prior to transformation, a macroblock of a frame picture may optionally be formatted as a frame macroblock, including blocks containing alternating lines of samples from each of the two component field pictures of the frame picture, or as a field macroblock, where the samples from different fields are arranged into separate blocks of the macroblock. The quantizer scale factor may be changed on a macroblock-by-macroblock basis and the weighting matrix may be changed on a picture-by-picture basis. Macroblocks, or coded blocks thereof, may be skipped if they have zero (or nearly zero) valued coded data. Appropriate codes are provided into the formatted bitstream of the encoded video signal, such as non-contiguous macroblock address increments, or coded block patterns, to indicate skipped macroblocks and blocks.

Additional formatting is applied to the variable length encoded sequence to aid in identifying the following items within the encoded bitstream: individual sequences of pictures, groups of pictures of the sequence, pictures of a group of pictures, slices of pictures, macroblocks, and blocks within macroblocks. Some of the above layers are optional, such as the group of pictures layer and the slice layer, and may be omitted from the bitstream if desired. Various parameters and flags are inserted into the formatted bitstream as well indicating each of the above noted choices (as well as others not described above). The following is a brief list of some of such parameters and flags: picture coding type (I,P,B), macroblock type (i.e., forward predicted, backward predicted, bidirectionally predicted, spatially encoded only) macroblock prediction type (field, frame, etc.), the quantizer parameter, etc. A flag may be inserted into the encoded video signal to indicate that a field repeated during a telecine process of converting film frames to NTSC video (using the well known 3:2 pull-down technique) was omitted from the encoded video signal.

In encoding the video signal according to MPEG-4, the encoder must produce a bitstream which does not overflow or underflow the buffer of a decoder which decodes the video signal. To that end, the encoder models the decoder's buffer and, in particular, monitors the fullness of the decoder's buffer. The decoder buffer is presumed to fill with bits of the bitstream at a particular rate which is a function of the channel rate at a certain moment of time. Pictures are presumed to be instantly removed at a particular instant relative to the decode and presentation time of each picture. See Linzer U.S. Pat. No. 6,091,776, incorporated herein by reference, for an in-depth discussion of some ways for an encoder to model a decoder buffer. Using such a model, the encoder can adjust various encoding parameters to control the number of bits produced for each encoded picture in an effort to prevent overflowing or underflowing the decoder's buffer. For example, the encoder can adjust the quantizer parameter, encourage selection of certain types of encoding over others, add stuffing data to pictures, change the number of B and P pictures, change a threshold quality level used in determining whether to perform intra or inter coding of macroblocks, etc., to increase or reduce the number of bits produced for each picture. Generally speaking, the encoder forms a target bit budget for each picture, which is a function of, among other parameters, the channel rate, the decoder buffer size (normally assumed to be a certain constant), and the vacancy/occupancy of the decoder's buffer immediately before and after removal of the particular picture for which a budget is being generated. The encoder then adjusts its encoding in an attempt to achieve the target bit budget for the picture.

Overall Architecture

FIG. 1A is an overall block diagram of an encoder incorporating features of the invention. It can be seen that the unencoded original quality picture sequence 112 is provided to an encoder 110 which encodes into a first compressed video stream 114. The first compressed video stream 114 has sufficient information to reconstruct an unencoded picture sequence having a first perceptual quality, which is typically (though not necessarily) substantially the same as the original input picture sequence 112. More precisely, the first compressed video stream 114 codes the original picture sequence with specific values for each of a plurality of "quality parameters". As used herein, a "quality parameter" includes, for example, resolution, frame rate, scan type (progressive or interleaved) and bit rate. As used herein, the term also includes parameters such as SNR, which are interdependent with others of the quality parameters. In the example of FIG. 1A, the first compressed video stream 114 is specified as having an MPEG-4/AVC format coded with a resolution of 1920×1080 pixels, progressively scanned, at a 60 Hz frame rate. Encoders 110 capable of encoding an unencoded 1080P@60 picture sequence into such a compressed video stream 114 are available commercially.

As used herein, the terms "video stream" and "output stream" are intended to include not only the picture data itself, but all the meta-data required to reconstruct the full pictures at some quality level. These streams are sometimes referred to herein as "bit streams", but the units of the stream in various embodiments can be bits, bytes, picture fields, frames, or any other unit that is appropriate for the embodiment.

The first compressed video stream 114 is provided to a transcoder 116, which converts it to a scalable compressed video stream 118. The scalable compressed video stream 118 consists of a base layer compressed video stream 120 and an enhancement layer compressed video stream 122. Additional enhancement layer compressed video streams may be included in other embodiments. In the embodiment of FIG. 1A, the base layer compressed video stream 120 has sufficient information to reconstruct an unencoded picture sequence having a second perceptual quality but no better. The second perceptual quality is lower than the perceptual quality of the first compressed video stream 114. The enhancement layer compressed video stream 122 has sufficient information, when combined with the base layer compressed video stream 120, to reconstruct an unencoded picture sequence having a perceptual quality that is better than that of the base layer compressed video stream 120. Typically it is substantially the same perceptual quality as the input compressed video stream 114, but that is not required in all embodiments.

More precisely, if the first compressed video stream 114 is coded with a first value for a particular one of the quality parameters (e.g. resolution), then the base layer compressed video stream 120 is coded with a second value for the particular quality parameter but no better, the second value being of lower quality than the first value. The enhancement layer compressed video stream 122, when combined with the base layer compressed video stream 120, codes the picture sequence with a third value for the particular quality parameter, the third value being of higher quality than the second value. Typically the third value is the same as the first value, but in some embodiments it can be between the first and second values.

In the example of FIG. 1A, the scalable compressed video stream 118 has the format described in ISO/IEC JTC 1/SC 29/WG 11, "Study text (version 3) of ISO/IEC 14496-10: 2005/FPDAM3 Scalable Video Coding (in integrated form with ISO/IEC 14996-10)", April 2007, (hereinafter "SVC draft") incorporated herein by reference. The first compressed video stream 114 is coded with a resolution of 1920× 1080 pixels. The base layer compressed video stream 120 is coded with a resolution of 1280×720 pixels, which is of lower quality than that of the first compressed video stream 114. The enhancement layer compressed video stream 122, when combined with the base layer compressed video stream 120, codes the picture sequence with the full input resolution of 1920× 1080. In another embodiment the enhancement layer compressed video stream 122 might, when combined with the base layer compressed video stream 120, code the picture sequence with an in-between resolution, such as 1600×900 pixels. Such an embodiment might also include a second enhancement layer compressed video stream (not shown) in the scalable compressed video stream 118. Additional enhancement layer compressed video streams are also possible.

Because of the flexibility offered by the scalable compressed video stream 118, decoders of different capabilities can be provided. FIGS. 1B and 1C illustrate two conventional receivers for decoding such a stream. The decoder 124 of FIG. 1B receives both the base layer compressed video stream 120 and the enhancement layer compressed video stream 122, and combines the information in both to output an unencoded picture sequence 126 having substantially the same quality as that of the original unencoded picture sequence 112, 1080P@60. Standards and methods for combining the base and enhancement streams are set out in the incorporated SVC draft. The decoder 128 of FIG. 1C, receives only the base layer compressed video stream 120 and outputs an unencoded picture sequence 130 having a lower quality (720P@60) than that of the original unencoded picture sequence 112. Presumably the decoder of FIG. 1C is less expensive than that of FIG. 1B.

FIG. 2 is a symbolic block diagram of an embodiment of transcoder 116 (FIG. 1A). It comprises a decoder 210 which receives the input compressed video stream 114 and outputs a decoded version 212. The decoder 210 can be conventional, and operates according to the principles described in the above-incorporated SVC draft for AVC-coded compressed video streams. The decoded video stream 212 has the same values for various quality parameters as are supported by the input compressed video stream 114. In the embodiment of FIG. 2, for example, it comprises a 60 Hz sequence of progressively scanned pictures at a resolution of 1920×1080 pixels.

The decoded video stream 212 is provided to a quality reducer 214, which develops a reduced-quality version 216 of the decoded version 212 of the input compressed video stream. The reduced quality version 216 is reduced in the sense that for at least one quality parameter, the value of that parameter in uncompressed video stream 216 is of lower quality than the value of that parameter in the decoded input compressed video stream 212. In the embodiment of FIG. 2, the quality parameter is resolution, and its value in the uncompressed video stream 216 is 1280×720, which is of lower quality than its value in the decoded input compressed video stream 212 (1920×1080). The quality reducer 214 includes conventional vertical and horizontal 3:2 decimation filters in order to down-convert each picture. The quality reducer 214 can be implemented in hardware, or on a general purpose computer. Decimation filters can be performed efficiently on modern general purpose CPUs using their built-in DSP instruction set, for example the SSE instructions in Intel X86 processors.

The reduced-quality version 216 of the decoded version of the input compressed video stream is then provided to a conventional AVC encoder 218, which encodes it according to the principles described in the above-incorporated SVC draft for AVC-coded compressed video streams. Its output is the base layer compressed output stream 120 (FIG. 1A). Preferably, AVC encoder 218 re-uses the AVC encoding decisions that had been made in the developing the input compressed video stream 114, scaled as necessary to account for the change in the quality parameter value(s). These coding decisions are represented in the input compressed video stream 114 as coding meta-data. For example, as indicated by broken line 219, decoder 210, as part of its decoding process, provides to encoder 218 at least the following information: picture types, macroblock modes, macroblock quantizer scale factors, motion vectors, macroblock partitions, number of bits per picture, field or frame formats used for macroblocks and pictures, and coded block patterns and locations of repeat fields. For the embodiment of FIG. 2, in which the quality reduction involves reducing the resolution, the following parameters are scaled to 720P by the intervening scaling unit 221: motion vectors, macroblock partitions, macroblock modes, and quantizer parameters. The re-use of the coding decisions represented in the input compressed video stream 114 greatly simplifies AVC encoder 218 since all the complexity of gathering statistics and selecting among numerous choices is avoided. Alternatively, a native 720P@60 AVC encoder can be used which is fully self-contained and does not re-use any prior coding decisions. While more expensive than an encoder that does re-use coding decisions, the use of a native 720P@60 encoder has the advantage that they already exist and are available commercially in volume. Of course, such a native 720P@60 AVC encoder could be located external to the transcoder or internal to it.

Returning to FIG. 2, the base layer compressed output stream 120 is also provided to another conventional decoder 220, which re-decodes the stream again according to the principles described in the above-incorporated SVC draft for AVC-coded compressed video streams. The output 222 of decoder 220 is a decoded version of the base layer compressed output stream 120, and mimics the output of decoder 128 in FIG. 1C. Thus in the embodiment of FIG. 2, the output 222 of decoder 220 includes an uncompressed image sequence having lower resolution than the decoded input compressed video stream 212, but progressively scanned like the stream 212, and at the same 60 Hz frame rate as stream 212.

The decoded base layer compressed output stream 222 is provided, together with the decoded input compressed video stream 212, to an enhancement layer calculator 224. Enhancement layer calculator 224 encodes the enhancement layer output stream 122 in accordance with the above-incorporated SVC draft. As specified in that draft, information from the compressed output stream 120 and the decompressed output stream 222 can be used in efficient compression of the video stream 212. By using a decoded version of the base layer compressed output stream 120, rather than the version 216 of the base layer compressed output stream prior to encoding, the enhancement layer output stream 122 will be accurate relative to the base layer stream as actually received by the receiver, rather than relative to an idealized version 216 that is not actually transmitted. It will be appreciated, however, that in another embodiment the version 216 of the base layer compressed output stream prior to encoding can be provided to the enhancement layer calculator 224 instead of the decoded version 222 of the base layer compressed output stream.

Similarly, the version of the input video stream provided to the enhancement layer calculator 224 in FIG. 2 is the decoded version 212, rather than the compressed version 114 itself. It will be appreciated that in another embodiment, it can be the compressed version 114 that is provided to the enhancement layer calculator 224.

The enhancement layer calculator 224 generates a coded representation of the 1080P input signal 212. First, signal 222 is upconverted to 1080P format. The compressed enhancement layer output stream 122 is then calculated using the inter-layer compression tools in the above-incorporated SVC draft document, and using the upconverted signal as a predictor of the decoded input compressed video stream 212. Usually the upconverted signal 222 is a very good predictor of the signal 212, especially for video that does not have a great deal of high spatial frequency information. The inter-layer compression tools in the above-incorporated SVC draft document will compress the enhancement layer stream for such video very efficiently. For video material in which the upconverted signal 222 is not a good predictor of the signal 212, non-scalable compression tools from the AVC standard can be used instead to produce parts of the enhancement layer output stream 122.

In a simple embodiment, in which the base layer encoder 218 used the original (scaled) 1080P AVC coding decisions exclusively, the SVC enhancement layer output stream 122 is also coded exclusively from the original input compressed video stream 114, as indicated by the broken line 226 in FIG. 2. The coding tools described in the SVC draft incorporated above are used. In particular, Inter-coded 1080P SVC macroblocks have their motion vectors, block partitioning, and residual predicted directly from the input compressed video stream 114, using the SVC Inter-layer Inter-coding mode.

In an embodiment in which AVC encoder 218 is standalone, and does not re-use the coding decisions from the input compressed video stream 114, it is still possible to re-use the coding decisions from one or the other of the base layer stream 120 or the input stream 114 when encoding the enhancement layer output stream 122.

In a more complicated embodiment, the transcoder evaluates other possible encoding modes also. For example, suppose the video signal being encoded is a Multiburst signal. In an Intra picture, the top row of macroblocks can be encoded using Inter-layer Intra prediction. For this signal, the high spatial frequency information in the multiburst will not be present in the 720P base layer and will have to be encoded in the Enhancement layer. However, for all macroblock rows below the top row, AVC Intra Vertical prediction will work very efficiently. Other embodiments will be apparent to the reader.

Output bit rate is controlled in the transcoder 116. In one embodiment, the original AVC encoder 110 (FIG. 1A) is controlled to operate at 90% of the bit rate expected for the combined base layer and SVC enhancement layer streams 120 and 122. The coding portion of the enhancement layer calculator 224 then reuses quantizer values from the base layer stream 120, and the resulting bit rate of the enhancement layer output stream 122 should approximate the remaining 10% of the combined bit rate budget.

In another embodiment, the original AVC encoder 110 (FIG. 1A) operates at a very high bit rate. This provides a higher quality input to the transcoder 116, but rate control information from the input compressed video stream 114 is not reusable. In this case, the transcoder 116 operates its own rate control using, for example, conventional buffer emulation feedback methods. A benefit of this more complicated embodiment is that the transcoder 116 can use jointly optimized base layer/enhancement layer rate control, in which bits are allocated to the base layer to improve both base layer and enhancement layer video quality. Many other embodiments for bit rate control will be apparent to the reader.

Implementation

In one embodiment, each of the functional blocks appearing in FIGS. 1A and 2 is implemented in hardware. In another embodiment, at least the transcoder 116 is implemented in software on a general purpose computer. A general purpose computer is an excellent platform for this purpose. The input and output video streams 114, 120 and 122 are carried over the IP/Ethernet interface. Motion estimation processing demands usually limit the quality possible with computer-based video encoding, but the transcoder 116 of FIG. 2 does not need to perform a great deal of motion estimation. The computer also contains a great deal of memory, sufficient for the transcoder 116 to store 720P pictures, 720P motion vectors and mode decisions, as well as the 1080P AVC motion vectors and mode decisions.

Figure 3:
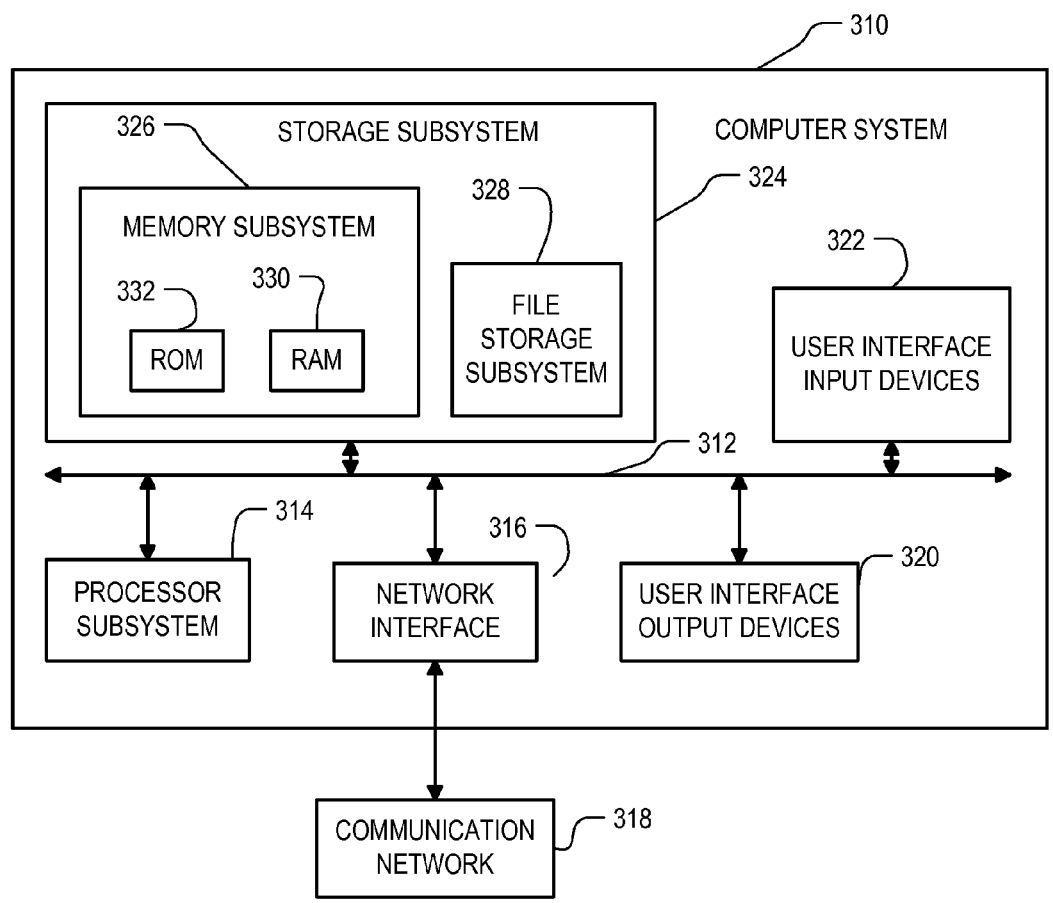
FIG. 3 is a simplified block diagram of a computer system 310 that can be used to implement software incorporating aspects of the present invention.

FIG. 3 is a simplified block diagram of a computer system 310 that can be used to implement software incorporating aspects of the present invention. While FIGS. 1A and 2 illustrate individual components as carrying out specified operations, it will be appreciated that in a software embodiment each component actually causes the computer system 310 to operate in the specified manner. The individual components may be housed in separate software modules in the computer system, or they may be combined into a single module, or a combination of both, and flow through the modules can be sequential or pipelined.

Computer system 310 typically includes a processor subsystem 314 which communicates with a number of peripheral devices via bus subsystem 312. These peripheral devices may include a storage subsystem 324, comprising a memory subsystem 326 and a file storage subsystem 328, user interface input devices 322, user interface output devices 320, and a network interface subsystem 316. The input and output devices allow user interaction with computer system 310. Network interface subsystem 316 provides an interface to outside networks, including an interface to communication network 318, and is coupled via communication network 318 to corresponding interface devices in other computer systems. Communication network 318 may comprise many interconnected computer systems and communication links. These communication links may be wireline links, optical links, wireless links, or any other mechanisms for communication of information. While in one embodiment, communication network 318 is the Internet, in other embodiments, communication network 318 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 322 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 310 or onto computer network 318.

User interface output devices 320 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 310 to the user or to another machine or computer system.

Storage subsystem 324 stores the basic programming and data constructs that provide the functionality of certain embodiments of the present invention. For example, the various modules implementing the functionality of certain embodiments of the invention may be stored in storage subsystem 324. These software modules are generally executed by processor subsystem 314.

Memory subsystem 926 typically includes a number of memories including a main random access memory (RAM) 930 for storage of instructions and data during program execution and a read only memory (ROM) 932 in which fixed instructions are stored. File storage subsystem 928 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 928. The host memory 926 contains, among other things, computer instructions which, when executed by the processor subsystem 914, cause the computer system to operate or perform functions as described herein. As used herein, processes and software that are said to run in or on "the host" or "the computer", execute on the processor subsystem 914 in response to computer instructions and data in the host memory subsystem 926 including any other local or remote storage for such instructions and data.

Bus subsystem 312 provides a mechanism for letting the various components and subsystems of computer system 310 communicate with each other as intended. Although bus subsystem 312 is shown schematically as a single bus, alternative embodiments of the bus subsystem may use multiple busses.

Computer system 310 itself can be of varying types including a personal computer, a portable computer, a workstation, a computer terminal, a network computer, a television, a mainframe, or any other data processing system or user device. Due to the ever changing nature of computers and networks, the description of computer system 310 depicted in FIG. 3 is intended only as a specific example for purposes of illustrating embodiments of the present invention. Many other configurations of computer system 310 are possible having more or less components than the computer system depicted in FIG. 3.

As used herein, a given signal, stream or picture sequence is "responsive" to a predecessor signal, stream or picture sequence if the predecessor signal, stream or picture sequence influenced the given signal, stream or picture sequence. If there is an intervening processing element, step or time period, the given signal, stream or picture sequence can still be "responsive" to the predecessor signal, stream or picture sequence. If the intervening processing element or step combines more than one signal, stream or picture sequence, the signal output of the processing element or step is considered "responsive" to each of the signal, stream or picture sequence inputs. If the given signal, stream or picture sequence is the same as the predecessor signal, stream or picture sequence, this is merely a degenerate case in which the given signal, stream or picture sequence is still considered to be "responsive" to the predecessor signal, stream or picture sequence. "Dependency" of a given signal, stream or picture sequence upon another signal, stream or picture sequence is defined similarly.

While the present invention is disclosed by reference to the preferred embodiments and examples detailed above, it is understood that these examples are intended in an illustrative rather than in a limiting sense. Numerous variations will be apparent to the reader. As an example, while the techniques described herein are described relative to systems addressing MPEG video coding standards, it will be appreciated that many of them are equally applicable to other video compression protocols as well.

Computer-assisted processing is implicated in some of the described embodiments. Accordingly, the invention may be embodied in methods for generating the scalable compressed video stream, systems including logic and resources to carry out such methods, systems that take advantage of computer-assisted implementations of such methods, media impressed with logic or software to carry out such methods, or data streams impressed with logic or software to carry out such methods. It is contemplated that modifications and combinations will readily occur to those skilled in the art, which modifications and combinations will be within the spirit of the invention and the scope of the following claims.

We claim as follows:

The invention claimed is:

1. A method for generating a scalable compressed video stream, comprising the steps of:
providing an input compressed video stream which is coded with a first value for a particular quality parameter; and
using a transcoder, transcoding the input compressed video stream to both a base output stream and an enhancement signal,
wherein the base output stream is coded with a second value for the particular quality parameter, the second value being of lower quality than the first value for the particular quality parameter,
and wherein the enhancement signal is combinable with the base output stream to yield a picture sequence having a third value for the particular quality parameter, the third value being of higher quality than the second value for the particular quality parameter,
and wherein the enhancement signal depends on the base output stream by combination with the base output stream, to reconstruct the picture sequence having the third value for the particular quality parameter.

2. A method according to claim 1, wherein the third value for the particular quality parameter is the same as the first value for the particular quality parameter.

3. A method according to claim 1, wherein the particular quality parameter comprises at least one member of the group of criteria consisting of resolution, frame rate, SNR, and bit rate.

4. A method according to claim 1, wherein the particular quality parameter comprises resolution.

5. A method according to claim 1, wherein the step of transcoding comprises the steps of:
calculating the enhancement signal in dependence upon both the input compressed video stream and the base output stream.

6. A method according to claim 5, wherein the step of calculating the enhancement signal comprises the steps of:
decoding the input compressed video stream to a decoded version of the input compressed video stream; and calculating the enhancement signal in dependence upon the decoded version of the input compressed video stream.

7. A method according to claim 5, wherein the step of calculating the enhancement signal comprises the steps of:
   decoding the base output stream to a decoded version of the base output stream; and
   calculating the enhancement signal in dependence upon the decoded version of the base output stream.

8. A method for generating a scalable compressed video stream, comprising the steps of:
   providing an input compressed video stream coded with a first value for a particular quality parameter;
   using a decoder, decoding the input compressed video stream to a decoded version of the input compressed video stream;
   developing a reduced quality version of the decoded version of the input compressed video stream, the reduced quality version having a second value for the particular quality parameter, the second value being of lower quality than the first value for the particular quality parameter;
   encoding the reduced quality version of the decoded version of the input compressed video stream to develop a base output stream;
   calculating an enhancement signal in dependence upon both the input compressed video stream and the base output stream; and
   outputting both the base output stream and the enhancement signal.

9. A method according to claim 8, wherein the enhancement signal, when combined with the base output stream, has a value for the particular quality parameter which is the same as the first value for the particular quality parameter.

10. A method according to claim 8, wherein the step of encoding the reduced quality version of the decoded version of the input compressed video stream to develop a base output stream, comprises the step of encoding the reduced quality version in dependence upon coding meta-data present in the input compressed video stream.

11. A method according to claim 8, wherein the step of encoding the reduced quality version of the decoded version of the input compressed video stream to develop a base output stream, comprises the step of encoding the reduced quality version in dependence upon coding meta-data present in the base output stream.

12. A method according to claim 8, wherein the step of calculating the enhancement signal comprises the steps of:
   decoding the base output stream to a decoded version of the base output stream; and
   calculating the enhancement signal in dependence upon both the decoded version of the input compressed video stream and the decoded version of the base output stream.

13. A method for generating a scalable compressed video stream, comprising the steps of:
   providing an input compressed video stream coded with a first resolution; and
   using a transcoder, transcoding the input compressed video stream to both a base output stream and an enhancement signal,
   wherein the base output stream is coded with a second resolution lower than the first resolution,
   and wherein the enhancement signal is combinable with the base output stream to yield a picture sequence having the first resolution,
   and wherein the enhancement signal depends on the base output stream by combination with the base output stream, to reconstruct the picture sequence having the first resolution.

14. Apparatus for generating a scalable compressed video stream, for use with an input compressed video stream which is coded with a first value for a particular quality parameter, comprising a transcoder which transcodes the input compressed video stream to both a base output stream and an enhancement signal,
   wherein the base output stream is coded with a second value for the particular quality parameter, the second value being of lower quality than the first value for the particular quality parameter,
   and wherein the enhancement signal is combinable with the base output stream, to yield a picture sequence having a third value for the particular quality parameter, the third value being of higher quality than the second value for the particular quality parameter,
   and wherein the enhancement signal depends on the base output stream by combination with the base output stream, to reconstruct the picture sequence having the third value for the particular quality parameter.

15. Apparatus according to claim 14, wherein the third value for the particular quality parameter is the same as the first value for the particular quality parameter.

16. Apparatus according to claim 14, wherein the particular quality parameter comprises at least one member of the group of criteria consisting of resolution, frame rate, SNR, and bit rate.

17. Apparatus according to claim 14, wherein the transcoder comprises means for calculating the enhancement signal in dependence upon both the input compressed video stream and the base output stream.

18. Apparatus according to claim 17, wherein the transcoder comprises:
   means for decoding the input compressed video stream to a decoded version of the input compressed video stream; and
   means for calculating the enhancement signal in dependence upon the decoded version of the input compressed video stream.

19. Apparatus according to claim 17, wherein the transcoder comprises:
   means for decoding the base output stream to a decoded version of the base output stream; and
   means for calculating the enhancement signal in dependence upon the decoded version of the base output stream.

20. Apparatus for generating a scalable compressed video stream, for use with an input compressed video stream coded with a first value for a particular quality parameter, comprising:
   a decoder coupled to receive the input compressed video stream, the decoder outputting a decoded version of the input compressed video stream;
   quality reducer means for developing a reduced quality version of the decoded version of the input compressed video stream, the reduced quality version having a second value for the particular quality parameter, the second value being of lower quality than the first value for the particular quality parameter;
   encoding means for encoding the reduced quality version of the decoded version of the input compressed video stream to develop a base output stream; and enhancement layer calculator means for calculating an enhancement signal in dependence upon both the input compressed video stream and the base output stream, the apparatus outputting both the base output stream and the enhancement signal.

21. Apparatus according to claim 20, wherein the enhancement signal, when combined with the base output stream, has a value for the particular quality parameter which is the same as the first value for the particular quality parameter.

22. Apparatus according to claim 20, wherein the encoding means comprises means for encoding the reduced quality version in dependence upon coding meta-data present in the input compressed video stream.

23. Apparatus according to claim 20, wherein the encoding means comprises means for encoding the reduced quality version in dependence upon coding meta-data present in the base output stream.

24. Apparatus according to claim 20, wherein the enhancement layer calculator means comprises:

means for decoding the base output stream to a decoded version of the base output stream; and means for calculating the enhancement signal in dependence upon both the decoded version of the input compressed video stream and the decoded version of the base output stream.

25. Apparatus for generating a scalable compressed video stream, for use with an input compressed video stream coded with a first resolution, comprising a transcoder for transcoding the input compressed video stream to both a base output stream and an enhancement signal, the transcoder having a mode of operation in which the base output stream is coded with a second resolution lower than the first resolution, and in which the enhancement signal is combinable with the base output stream to yield a picture sequence having the first resolution and wherein the enhancement signal depends on the base output stream by combination with the base output stream, to reconstruct the picture sequence having the first resolution.

\* \* \* \* \*